US012413908B2

(12) United States Patent
Wang et al.

(10) Patent No.: US 12,413,908 B2
(45) Date of Patent: Sep. 9, 2025

(54) SOUND FIELD CONTROL DEVICE AND FILTER DETERMINATION SYSTEM

(71) Applicant: HONDA MOTOR CO., LTD., Tokyo (JP)

(72) Inventors: Xun Wang, Wako (JP); Toshio Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 258 days.

(21) Appl. No.: 18/191,061

(22) Filed: Mar. 28, 2023

(65) Prior Publication Data

US 2023/0319480 A1 Oct. 5, 2023

(30) Foreign Application Priority Data

Mar. 31, 2022 (JP) ................................ 2022-060443

(51) Int. Cl.
*H04R 3/12* (2006.01)
*H04R 3/04* (2006.01)
*H04R 5/04* (2006.01)

(52) U.S. Cl.
CPC ................ *H04R 5/04* (2013.01); *H04R 3/04* (2013.01); *H04R 3/12* (2013.01); *H04R 2420/01* (2013.01)

(58) Field of Classification Search
CPC ... H04R 2499/13; H04R 2420/01; H04R 3/12
See application file for complete search history.

(56) References Cited

U.S. PATENT DOCUMENTS

2012/0140945 A1* 6/2012 Harris .................... H04S 7/301 381/86
2022/0068253 A1* 3/2022 Pignier ............ G10K 11/17881

FOREIGN PATENT DOCUMENTS

JP 2004-147311 A 5/2004
JP 2008-252625 A 10/2008

* cited by examiner

*Primary Examiner* — James K Mooney
(74) *Attorney, Agent, or Firm* — Rankin, Hill & Clark LLP

(57) ABSTRACT

Provided is a sound field control device including: a non-control-target component extractor configured to extract a non-control-target component from a sound source signal; a speaker selector configured to select one of plural speakers as a speaker to output the non-control-target component, based on the location of the listening area; a control-target component extractor configured to extract a control-target component from the sound source signal; a sound controller configured to, for each of the plural speakers, adjust the amplitude and the phase of the control-target component, based on locations of the listening area and a quiet area using filters each having coefficients set for the speaker; and sound combiners provided respectively for the plural speakers, the sound combiners each configured to combine the control-target component whose amplitude and phase have been adjusted and the non-control-target component and to output the combined result to the corresponding speaker.

5 Claims, 7 Drawing Sheets

FIG. 7

| | LISTENING AREA 2-1 | | | | | ... | LISTENING AREA 2-L | | | | |
|---|---|---|---|---|---|---|---|---|---|---|---|
| FREQUENCY f | Wr1 | Wi1 | ... | WrM | WiM | ... | Wr1 | Wi1 | ... | WrM | WiM |
| 30[Hz] | 0.2 | 0.5 | ... | 0.2 | 0.5 | ... | 0.2 | 0.5 | ... | 0.2 | 0.5 |
| 31[Hz] | −0.1 | 0.3 | ... | −0.1 | 0.3 | ... | −0.1 | 0.3 | ... | −0.1 | 0.3 |
| ... | ... | ... | ... | ... | ... | ... | ... | ... | ... | ... | ... |
| 500[Hz] | 0.3 | 0.7 | ... | 0.3 | 0.7 | ... | 0.3 | 0.7 | ... | 0.3 | 0.7 |

SOUND FIELD CONTROL DEVICE AND FILTER DETERMINATION SYSTEM

CROSS REFERENCE TO RELATED APPLICATIONS

The present application claims the foreign priority benefit under Title 35 U.S.C. § 119 of Japanese Patent Application No. 2022-060443, filed on Mar. 31, 2022, in the Japan Patent Office, the disclosure of which is herein incorporated by reference in its entirety.

BACKGROUND OF THE INVENTION

1. Field of the Invention

The present invention relates to a sound field control device configured to produce a listening area and a quiet area in a sound field and to a filter determination system configured to determine filters to be used in the sound field control device.

2. Description of Related Art

In recent years, efforts have been made to provide access to sustainable conveyance systems that consider vulnerable people such as elderly people and children among traffic participants. To achieve the aim, the efforts are focusing on research and development to further improve the safety and convenience of traffic through development related to improving the comfort of vehicles. Japanese Patent Publication No. 2004-147311 describes a parametric speaker which has high directionality by utilizing ultrasonic waves as a carrier of audible sound, as a technique for producing in a predetermined area a listening area where sound is audible and a quiet area where the sound is inaudible to improve the comfort of the vehicle.

Japanese Patent Publication No. 2008-252625 describes a directional speaker system including a primary sound source for producing a sound for listening and a secondary sound source for produce a sound for canceling the sound produced by the primary sound source.

Regarding the improvement of comfort in the vehicle, it is difficult for the technique described in Japanese Patent Publication No. 2004-147311 to produce a wide listening area because the technique produces audible sound by interference of ultrasonic waves. In addition, the audible sound could reach the quiet area by reflection. The technique described in Japanese Patent Publication No. 2008-252625 requires an expensive processor be used because a large amount of computation is consumed due to the use of a finite impulse response (FIR) filter.

The present invention has been made in view of the above-described circumstances, and it is an object of the present invention to provide a sound field control device capable of producing a listening area and a quiet area with a small amount of computation and thus reducing the cost, which contributes to evolving sustainable conveyance system and to provide a filter determination system that determines the filters to be used in the sound field control device.

SUMMARY OF THE INVENTION

Provided by an embodiment according to the present invention is a sound field control device for producing a listening area and a quiet area in a sound field using a plurality of speakers, the sound field control device including: a non-control-target component extractor configured to extract a non-control-target component from a sound source signal; a speaker selector configured to select at least one of the plurality of speakers as a speaker to output the non-control-target component, based on a location of the listening area; at least one control-target component extractor each configured to extract a control-target component from the sound source signal; at least one sound controller provided respectively to the at least one control-target component extractor and configured to, for each of the plurality of speakers, adjust an amplitude and a phase of the control-target component extracted by the corresponding control-target component extractor, based on locations of the listening area and the quiet area using a filter having coefficients set for the speaker; and a plurality of sound combiners provided respectively for the plurality of speakers, the sound combiners each configured to combine the control-target component which has been extracted by the at least one control-target component extractor and whose amplitude and phase have been adjusted and the non-control-target component to generate a combined result and to output the combined result to the corresponding speaker.

Also provided by an embodiment according to the present invention is a filter determination system for setting the coefficients of the filters of the sound field control device, the filter determination system including: at least one microphone used to pick up sounds generated by the plurality of speakers, at a plurality of positions in the sound field; and a filter determination device configured to determine the coefficients of the filters based on the result of picking up the sounds by the at least one microphone so as to maximize a value obtained by dividing a value of sound energy in the listening area by a value of sound energy in the quiet area.

According to the present invention, it is possible to produce a listening area and a quiet area with a small amount of computation and thus reduce the cost, which contributes to evolving sustainable conveyance system.

BRIEF DESCRIPTION OF THE DRAWINGS

FIG. 7 illustrates an example of a table that associates controlled frequencies with filter coefficients per listening area.

DETAILED DESCRIPTION OF EMBODIMENT

Figure 1:
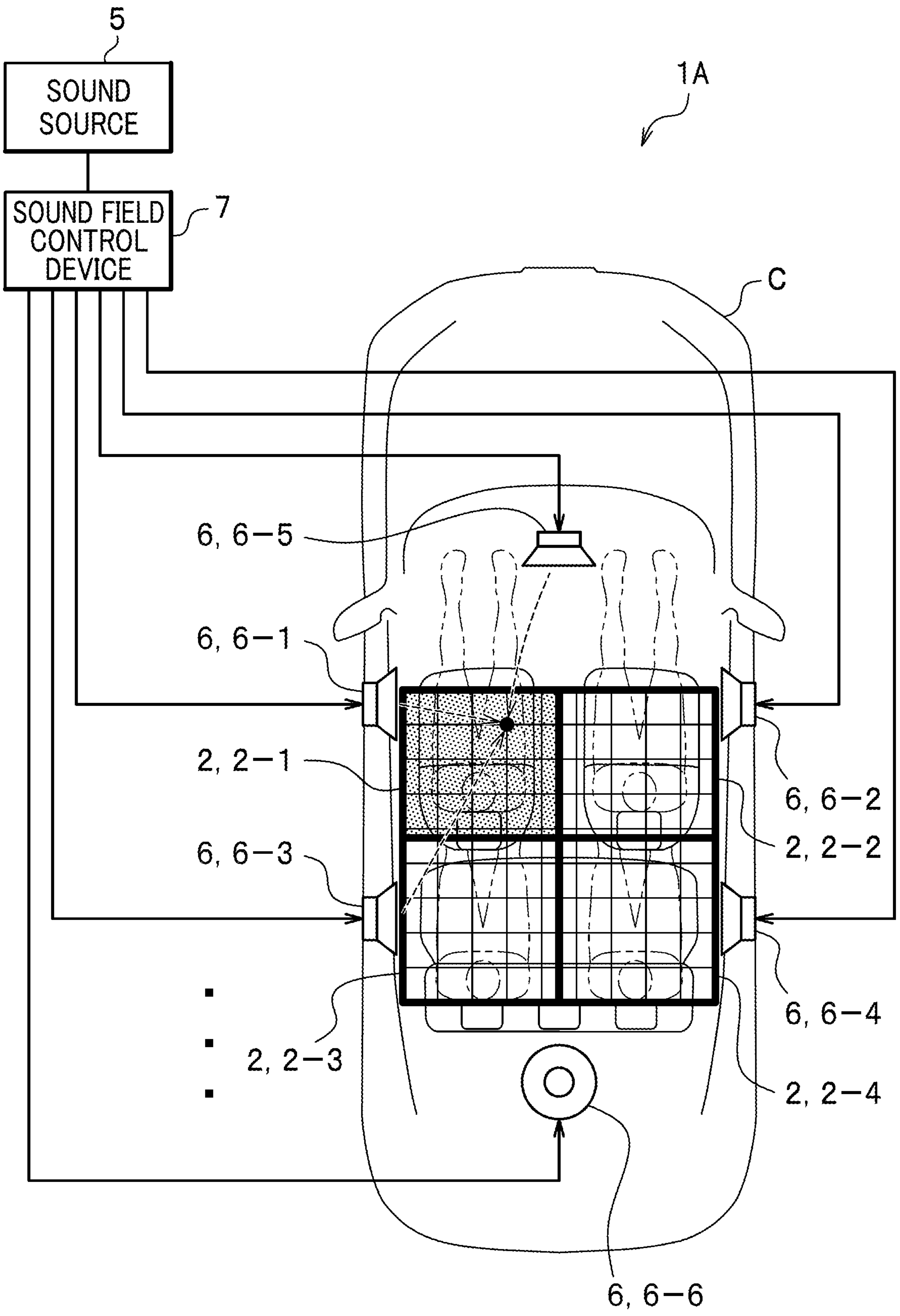
FIG. 1 is a schematic diagram of a vehicle to which a sound field control system and a filter determination system according to an embodiment of the invention have been applied.

Subsequently, an embodiment of the invention is described in detail with reference to the drawings as appropriate. Note that in the drawings, “front” and “rear” respectively represents forward and rearward directions i.e., vehicle front-rear directions, of the vehicle; and "left" and "right" respectively represents left and right directions (vehicle width directions) as seen from the driver's seat.

Sound Field Control System

As illustrated in FIG. 1, a sound field control system 1A according to an embodiment of the present invention generates a sound field in the vehicle compartment of a vehicle C, which sound field is divided into a plurality of listening areas 2 (2-1 to 2-L, where L=4 in the embodiment) and a quiet area 3 (see FIG. 5) which is the counterpart of the listening areas 2

Listening Area

The listening areas 2 are areas for providing sound to occupants located in the listening areas 2. The listening areas 2 are set to locations corresponding to the seats (occupants) of the vehicle C. The listening area 2-1 is set at a position corresponding to the driver's seat of the front seats of the vehicle C. The listening area 2-2 is set at a position corresponding to the passenger seat of the front seats of the vehicle C. The listening area 2-3 is set at a position corresponding to the left seat of the rear seats of the vehicle C. The listening area 2-4 is set at a position corresponding to the right seat of the rear seats of the vehicle C.

Quiet Area

The quiet area 3 (see FIG. 5) is an area for not providing sound to occupant(s) located in the quiet area. The quiet area 3 is set is regions other than the listening areas 2 when the listening areas 2 are set in the vehicle compartment.

Figure 2:
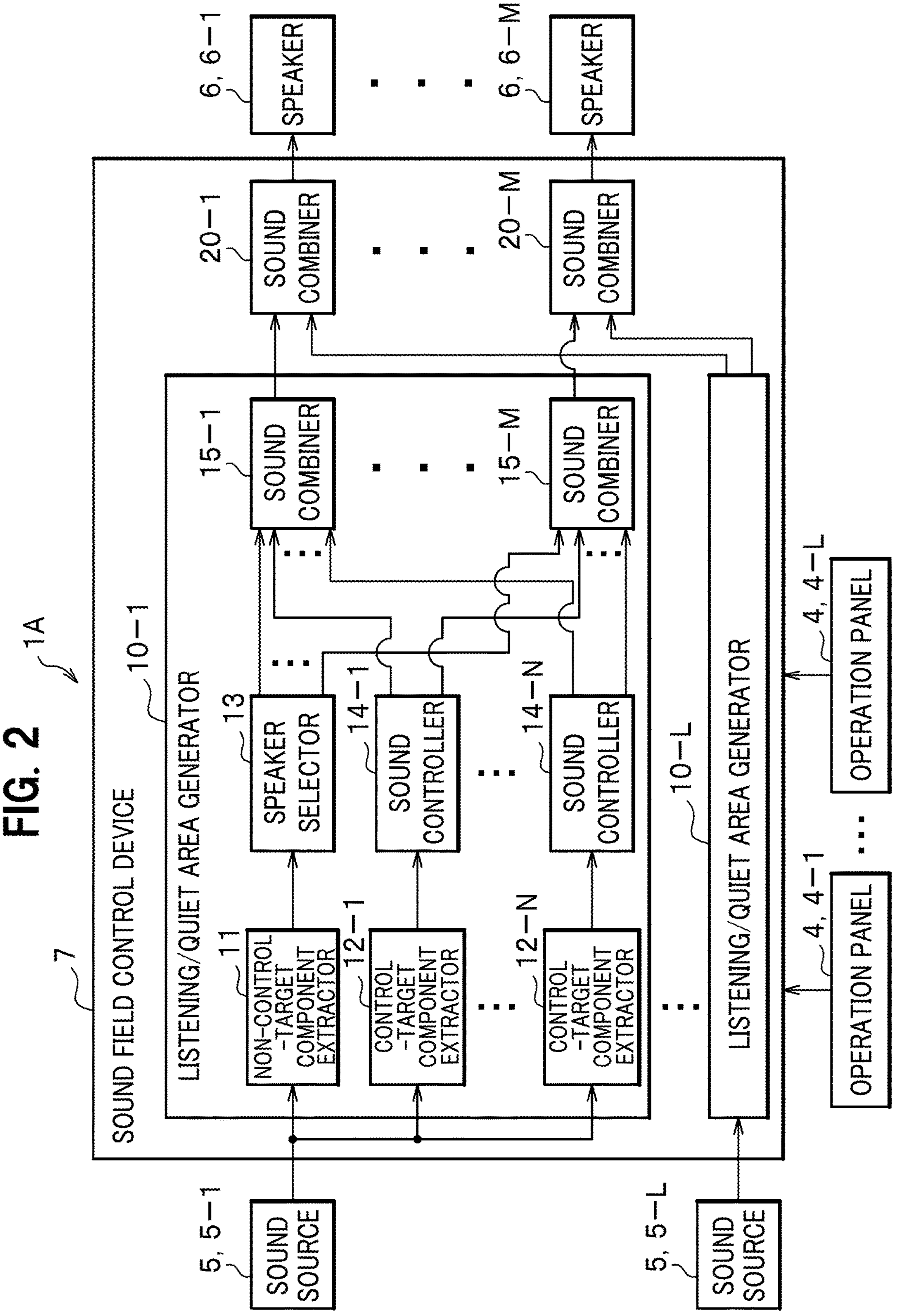
FIG. 2 is a schematic block diagram of the sound field control system according to the embodiment of the invention.

As illustrated in FIG. 2, the sound field control system 1A includes a plurality of operation panels 4 (4-1 to 4-L, where L=4 in the embodiment), a plurality of sound sources 5 (5-1 to 5-L, where L=4 in the embodiment), a plurality of speakers 6 (6-1 to 6-M, where M=6 in the present embodiment), and a sound field control device 7.

Operation Panel and Sound Source

The operation panels 4 and the sound sources 5 are each provided for listening areas 2, respectively. The operation panels 4 each includes switch(s), button(s), and/or a touch panel, which are operable by the corresponding occupant of the vehicle C. The sound sources 5 each feed, for example, a sound signal (sound source signal) according to the result of an operation to the corresponding operation panel 4 to the sound field control device 7.

Speaker

At least one of the speakers 6 is provided for each of the listening areas 2. In the present embodiment, the speaker 6-1 is provided on a side of the driver's seat; the speaker 6-2 is provided on a side of the passenger seat; the speaker 6-3 is provided on the left side of the rear seats; the speaker 6-4 is provided on the right side of the rear seats; the speaker 6-5 is provided on a front part of the vehicle compartment; and the speaker 6-6 is provided on a dash board of a rear part the vehicle compartment.

Sound Field Control Device

The sound field control device 7 generates sound signals for producing the listening areas 2 and the quiet area 3 (see FIG. 5) based on the sound signals (sound source signals) fed from the sound sources 5 and feeds the generated sound signals to the speakers 6. The sound field control device 7 is constructed of a Central Processing Unit (CPU), a Read-Only Memory (ROM), a Random Access Memory (RAM), and an input-output circuitry. The sound field control device 7 includes, as functional blocks, a plurality of listening/quiet area generators 10 (10-1 to 10-L, where L=4 in this embodiment) and a plurality of sound combiners 20 (20-1 to 20-M, where M=6 in the present embodiment).

Listening/Quiet Area Generator

The listening/quiet area generators 10 correspond to the listening areas 2 respectively. In the present embodiment, the listening/quiet area generator 10-1 produces the listening area 2-1 and produces a quiet area 3 in the areas other than the listening area 2-1; the listening/quiet area generator 10-2 produces the listening area 2-2 and produces a quiet area 3 in the areas other than the listening area 2-2; the listening/quiet area generator 10-3 produces the listening area 2-3 and produces a quiet area 3 in the areas other than the listening area 2-3; and the listening/quiet area generator 10-4 produces the listening area 2-4 and produces a quiet area 3 in the areas other than the listening area 2-4.

The listening/quiet area generators 10 each separates the sound signal fed from the corresponding sound source 5 into a non-control-target component and a control-target component, causes the speaker 6 near the corresponding listening area 2 to produce a sound of the non-control-target component, and adjusts the control-target component for each of the plurality of speakers 6 and causes the speaker 6 to produce a sound of the adjusted control-target component, thereby to generate the listening areas 2 and the quiet area 3. Here, the non-control-target component means, of the sound signals fed from the corresponding sound source 5, signals within a frequency band in which signals are attenuated according to the distance due to less influence of reflection owing to good sound absorption effect of the seats and interior members (signals in a relatively high frequency band, e.g., 500 Hz or higher). Here, the control-target component means, of the sound signals fed from the corresponding sound source 5, signals within a frequency band in which signals are not attenuated (do not tend to be attenuated) according to the distance due to great influence of reflection owing to poor sound absorption effect of the seats and interior members (signals in a relatively low frequency band, e.g., less than 500 Hz). The listening/quiet area generators 10 each include, as functional blocks, a non-control-target component extractor 11, a plurality of control-target component extractors 12 (12-1 to 12-N), a speaker selector 13, a plurality of sound controllers 14 (14-1 to 14-N), a plurality of sound combiners 15 (15-1 to 15-M, where M=6 in the present embodiment).

Non-Control-Target Component Extractor

The non-control-target component extractor 11 is a bandpass filter that receives the sound signal fed from the corresponding sound source 5 and extracts a non-control-target component from the received sound signal. The passband of the bandpass filter is set for the frequency band of the non-control-target component (e.g., frequency band starting from 500 Hz or higher). The non-control-target component extractor 11 outputs the extracted non-control-target component to the speaker selector 13.

Control-Target Component Extractor

The control-target component extractors 12 are provided respectively to frequency bands of the control-target components of the sound signal fed from the corresponding sound source 5. Each of the control-target component extractors 12 receives the sound signal fed from the corresponding sound source 5 and extracts a control-target component (a component of a frequency band corresponding to the control-target component extractor 12) from the received sound signal using a Single-Frequency Adaptive Notch (SAN) filter. The SAN filter is a filter for adjusting the amplitude and phase of a periodic sound. The SAN filter is capable of generating a desired sound signal with a significantly less amount of computation compared to FIR filters.

Each of the control-target component extractors 12 outputs the extracted control-target component to the corresponding sound controller 14.

Figure 3:
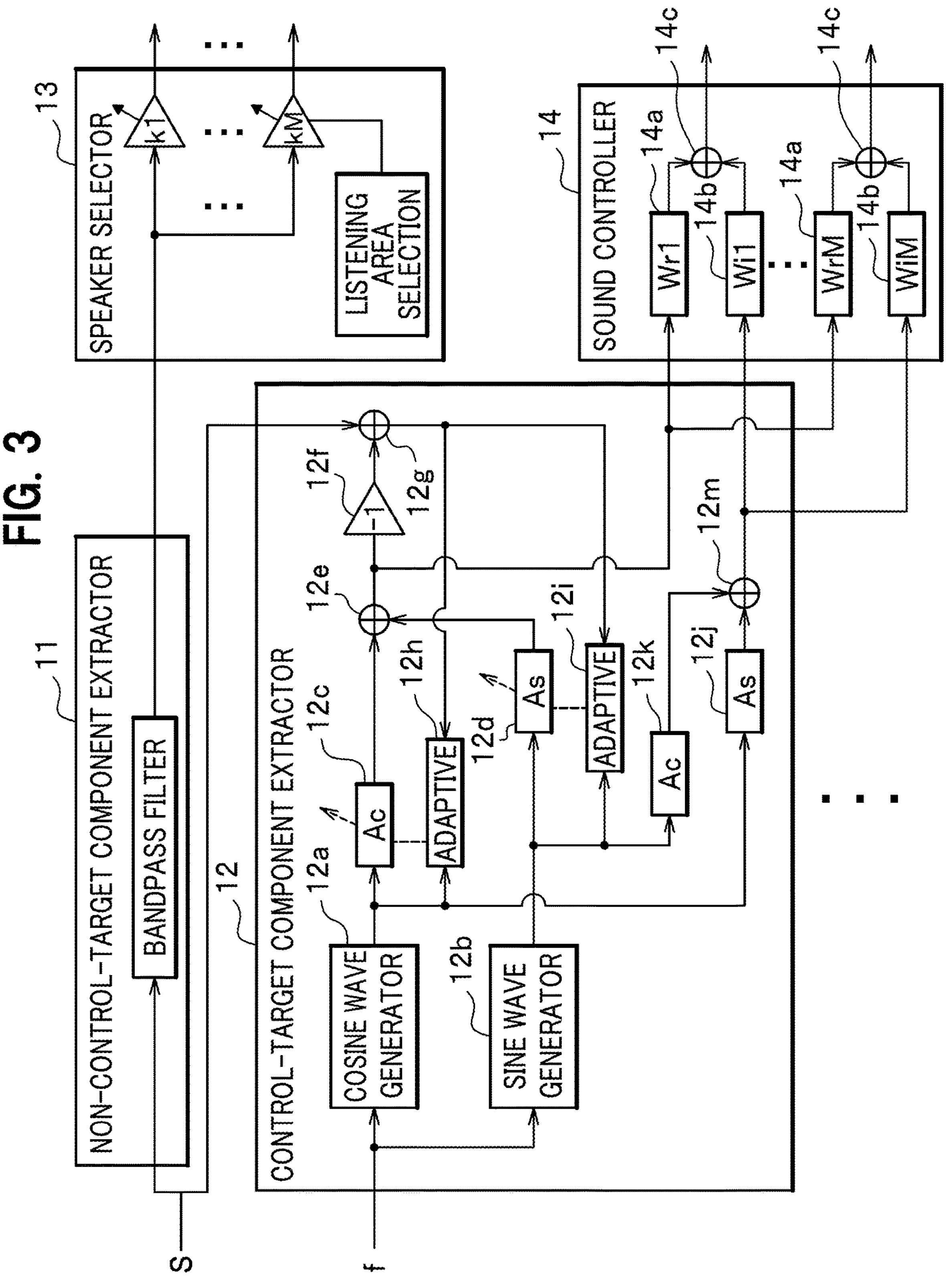
FIG. 3 is a schematic block diagram illustrating details of a listening/quiet area generator illustrated in FIG. 2.

As illustrated in FIG. 3, the control-target component extractor 12 separates a sound signal into two waveforms having different phases, amplifies them individually, and then combine the amplified waveforms, to extract a control-target component. The functional blocks of the control-target component extractor 12 include: a cosine wave generator 12*a*, a sine wave generator 12*b*, amplifiers 12*c*, 12*d*, a combiner 12*e*, an inverter 12*f*, a combiner 12*g*, updaters 12*h* and 12*i*, amplifiers 12*j* and 12*k*, and a combiner 12*m*.

The cosine wave generator 12*a* is a circuit configured to generate a cosine wave of the frequency band (angular frequency band ω=2πf, where f denotes a frequency) corresponding to the control-target component extractor 12. The cosine wave generator 12*a* outputs the generated cosine wave (cos(ωt)) to the amplifier 12*c*, updater 12*h*, and amplifier 12*j*.

The sine wave generator 12*b* is a circuit configured to generate a sine wave of the frequency band corresponding to the control-target component extractor 12. The sine wave generator 12*b* outputs the generated sine wave (sin(ωt)) to the amplifier 12*d*, updater 12*i*, and amplifier 12*k*.

The amplifier 12*c* amplifies (adjusts the amplitude of) the cosine wave according to an SAN filter coefficient (Ac) set to the amplifier 12*c* and outputs the amplification result (Ac×cos(ωt)) to the combiner 12*e*. The amplifier 12*d* amplifies (adjusts the amplitude of) the sine wave according to an SAN filter coefficient (As) set to the amplifier 12*d* and outputs the amplification result (As×sin(ωt)) to the combiner 12*e*. The combiner 12*e* combines the amplified cosine wave and sine wave and output the combined result (Ac×cos(ωt)+As×sin(ωt)) to the inverter 12*f* and to the sound controller 14. The combined result of the combiner 12*e* is a result of extracting from the sound signal S a cosine wave of the frequency band (angular frequency ω) corresponding to the control-target component extractor 12. Note that the amplification of the cosine wave and sine wave by the amplifiers 12*c* and 12*d* includes such a case that the amplitude after amplification is less than the amplitude before amplification (the same applies to the other amplifiers).

The inverter 12*f* inverts the positive/negative (polarity) of the output from the combiner 12*e* and outputs the inverted result (−{Ac×cos(ωt)+As×sin(ωt)}) to the combiner 12*g*. The combiner 12*g* combines the output from the inverter 12*f* and the sound signal S fed from the sound source 5 and outputs the combined result (S−{Ac×cos(ωt)+As×sin(ωt)}) to the updaters 12*h* and 12*i*.

The updaters 12*h* and 12*i* respectively update the coefficients Ac and As using a Least Mean Square (LMS) algorithm so that the output from the combiner 12*g* (i.e., difference between the sound signal S from the sound source 5 and the output from the combiner 12*e*) becomes zero. The updater 12*h* updates the coefficient Ac based on the output from the cosine wave generator 12*a* and the output from the combiner 12*g* so that the output from the combiner 12*g* becomes zero, and applies the result of the update to the amplifiers 12*c* and 12*k*. The updater 12*i* updates the coefficient As based on the output from the sine wave generator 12*b* and the output from the combiner 12*g* so that the output from the combiner 12*g* becomes zero, and applies the result of the update to the amplifiers 12*d* and 12*j*.

The update operations on the coefficients Ac and As by the updaters 12*h* and 12*i* are represented by Equations (1), (2), and (3) below.

$$Ac(n+1)=Ac(n)+\mu\cdot e(n)\cdot\cos(\omega n\Delta t) \quad (1)$$

$$As(n+1)=As(n)+\mu\cdot e(n)\cdot\sin(\omega n\Delta t) \quad (2)$$

$$e(n)=s(n)-\{Ac(n)\cdot\cos(\omega n\Delta t)+As(n)\cdot\sin(\omega n\Delta t)\} \quad (3)$$

Here, n represents a discrete time; Δt represents a sampling time period; and μ represents a step size parameter. The bandwidth of the control-target component to be extracted by the control-target component extractor 12 is controlled by the setting of the step size parameter μ.

The amplifier 12*j* amplifies (adjusts the amplitude of) the cosine wave according to the SAN filter coefficient (As) set to the amplifier 12*j* and outputs the amplification result (As×cos(ωt)) to the combiner 12*m*. The amplifier 12*k* amplifies (adjusts the amplitude of) the sine wave according to the SAN filter coefficient (Ac) set to the amplifier 12*k* and outputs the amplification result (Ac×sin(ωt)) to the combiner 12*m*. The combiner 12*m* combines the amplified cosine wave and sine wave and output the combined result (As×cos(ωt)+Ac×sin(ωt)) to the sound controller 14. The combined result of the combiner 12*m* is a result of extracting from the sound signal S a sine wave of the frequency band corresponding to the control-target component extractor 12.

Speaker Selector

The speaker selector 13 receives the non-control-target component, selects at least one of the speakers 6 from which the received non-control-target component is to be outputted, and output the non-control-target component to the selected speaker 6 (in the present embodiment, to the sound combiner 20 corresponding to the selected speaker 6). The speaker selector 13 may be configured to select the speaker 6 closest to the listening area 2 corresponding to the non-control-target component as the output destination.

In the present embodiment, the speaker selector 13 of the listening/quiet area generator 10-1 selects the speaker 6-1 (sound combiner 20-1) as the output destination of the non-control-target component originating from the sound source 5-1; the speaker selector 13 of the listening/quiet area generator 10-2 selects the speaker 6-2 (sound combiner 20-2) as the output destination of the non-control-target component originating from the sound source 5-2; the speaker selector 13 of the listening/quiet area generator 10-3 selects the speaker 6-3 (sound combiner 20-3) as the output destination of the non-control-target component originating from the sound source 5-3; and the speaker selector 13 of the listening/quiet area generator 10-4 selects the speaker 6-4 (sound combiner 20-4) as the output destination of the non-control-target component originating from the sound source 5-4.

Sound Controller

The sound controller 14 receives the control-target components (combined results of the combiners 12*e* and 12*m*) and adjusts the amplitudes and phases of the received control-target components using SAN filters different from the control-target component extractor 12. The sound controller 14 includes filters 14*a* and 14*b* and a combiner 14*c* for each of the speakers 6.

The filter 14*a* adjusts the combined result from the combiner 12*e* according to an SAN filter coefficient Wr set to the filter 14*a* and outputs the adjusted result (Wr{Ac×cos(ωt)+As×sin(ωt)}) to the combiner 14*c*. The filter 14*b* adjusts the combined result from the combiner 12*e* according to an SAN filter coefficient Wi set to the filter 14*b* and outputs the adjusted result (Wi{As×cos(ωt)+Ac×sin(ωt)}) to the combiner 14*c*. The combiner 14*c* combines the adjusted results of the filters 14*a* and 14*b* and outputs the combined result to the corresponding sound combiner 15.

The coefficients Wr, Wi are values to be multiplied to the amplitudes of the combined results. The coefficients Wr, Wi are set for the corresponding speaker 6. For example, the filter 14*a* corresponding to the m-th speaker 6-*m* adjusts (the amplitude of) the combined result from the combiner 12*e* using the coefficient Wrm (m=1, . . . , M, where M=6 in the present embodiment).

Sound Combiner

Each of the sound combiners 15 combines, for the corresponding speaker 6, the sound signals of the frequency bands of the control-target components generated by the plurality of sound controllers 14 (and the non-control-target component as needed) and outputs the combined sound signal to the corresponding sound combiner 20.

Sound Combiner

Each of the sound combiners 20 combines the sound signals each combined by the sound combiners 15 of each of the plurality of listening/quiet area generators 10 and outputs the combined sound signal to the corresponding speaker 6.

Figure 4:
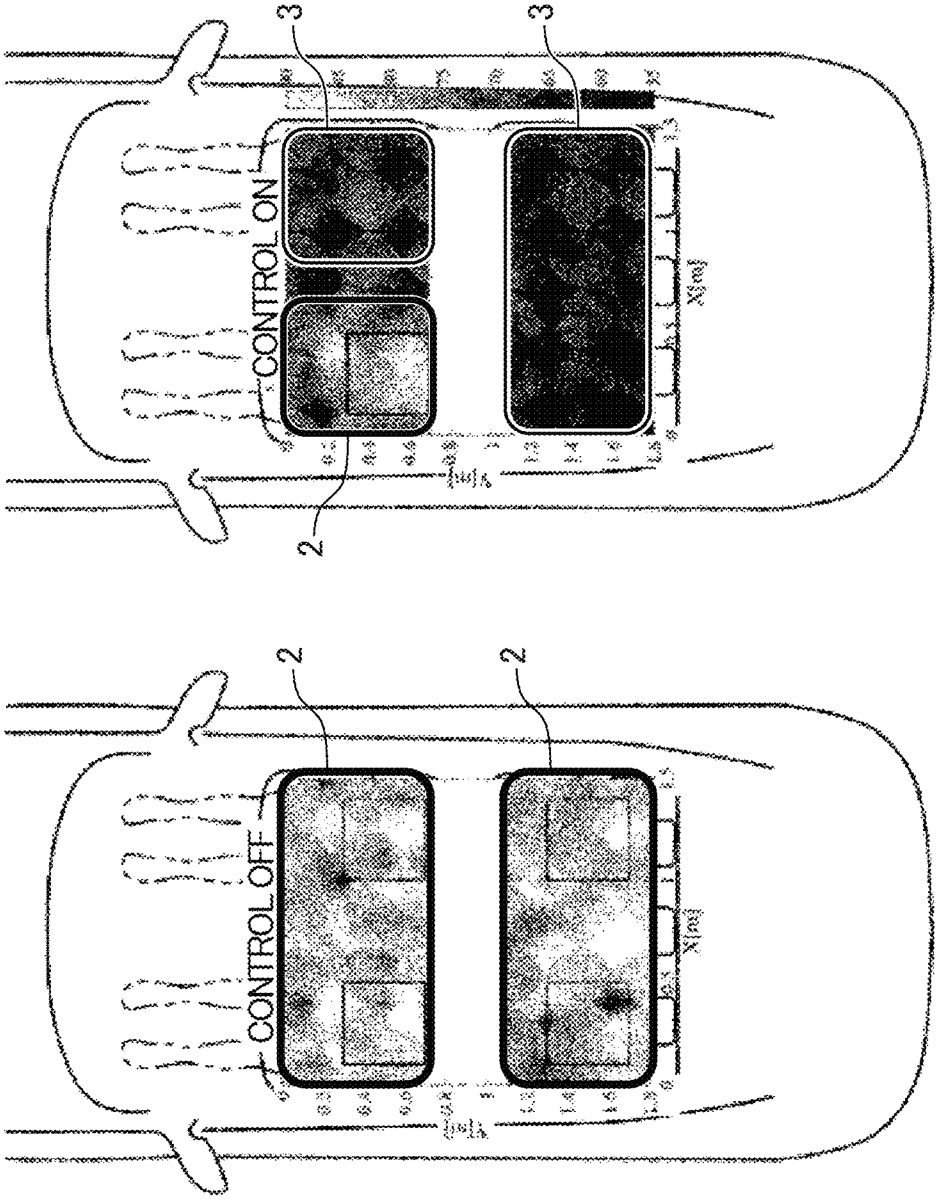
FIG. 4 is a schematic diagram of an example of a listening area and a quiet area produced by the sound field control system according to the embodiment of the invention.

As illustrated in left part of FIG. 4, the sound field control device 7 may, in a state in which control is turned off, generate a sound that produces a listening area 2 (less densely hatched area)(see FIG. 5) in the entire space of the vehicle compartment. As shown in right part of FIG. 4, the sound field control device 7 may, in a state in which control is turned on, generate a sound that produces, in the vehicle compartment, a listening area 2 (less densely hatched area) in the vicinity of the driver's seat and a quiet area 3 (more densely hatched area)(see FIG. 5) in the vicinities of the other seats. In FIG. 4, the less densely hatched areas each represent an area where sound is audible (a high decibel area); and the more densely hatched areas each represent an area where sound is inaudible (a low decibel area).

Figure 5:
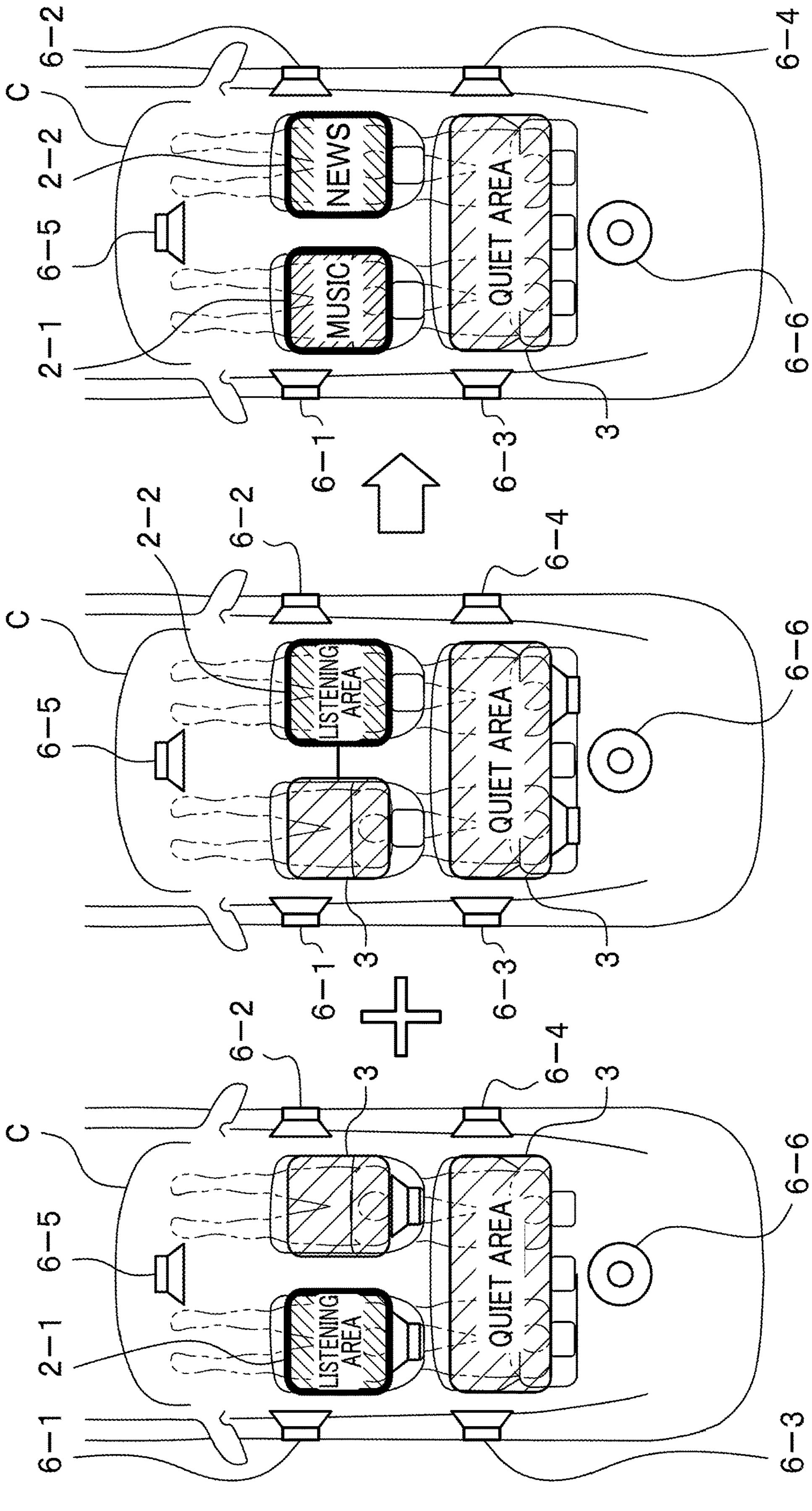
FIG. 5 is a schematic diagram of an example of a listening area and a quiet area produced by the sound field control system according to the embodiment of the invention.

For example, as shown in FIG. 5, the listening/quiet area generator 10-1 corresponding to the listening area 2-1 may generate, as a result of the combining by the sound combiners 15, sound signals respectively for speakers 6 such that music is audible in the listening area 2-1 and the other areas are configured as a quiet area 3 in which the music is inaudible. In addition, the listening/quiet area generator 10-2 corresponding to the listening area 2-2 may generate, as a result of the combining by the sound combiners 15, sound signals respectively for speakers 6 such that news is audible in the listening area 2-2 and the other areas are configured as a quiet area 3 in which the news is inaudible. The sound field control device 7 generates, as a result of the combining by the sound combiners 20, sound signals respectively for speakers 6 such that the music is audible in the listening area 2-1, the news is audible in the listening area 2-2, and the other areas are configured as quiet area 3 in which the music and the news are inaudible.

A sound field control device 7 according to the embodiment of the present invention is a device for producing a listening area 2 and a quiet area 3 using a plurality of speakers 6 in a sound field. The sound field control device 7 includes: a non-control-target component extractor 11 configured to extract a non-control-target component from a sound source signal; a speaker selector 13 configured to select at least one of the plurality of speakers 6 as a speaker to output the non-control-target component, based on the location of the listening area 2; at least one control-target component extractor 12 each configured to extract a control-target component from the sound source signal; at least one sound controller 14 provided respectively to the at least one control-target component extractor 12 and configured to, for each of the plurality of speakers 6, adjust an amplitude and a phase of the control-target component extracted by the corresponding control-target component extractor 12, based on locations of the listening area 2 and the quiet area 3 using a filter having coefficients set for the speaker 6; a plurality of sound combiners 15 provided respectively for the plurality of speakers 6, the sound combiners 15 each configured to combine the control-target component which has been extracted by the at least one control-target component extractor 12 and whose amplitude and phase have been adjusted and the non-control-target component to generate a combined result and to output the combined result to the corresponding speaker 6.

With this configuration, the sound field control device 7 causes the speaker 6 near the listening area 2 to generate a sound in the frequency band that is attenuated according to the distance, without adjusting the sound signal, which makes it possible to produce the listening area 2 and the quiet area 3 with a small amount of computation and thus lower the cost. When the sound field control device 7 is configured such that the non-control-target component extractor 11 and/or control-target component extractor 12 is configured to perform processing (extraction) using an SAN filter, the sound field control device 7 can produce the listening area 2 and the quiet area 3 with a small amount of computation compared to a case where an FIR filter is used, and thus the cost is lowered. That is, the sound field control device 7 contributes to evolving sustainable conveyance system.

In the sound field control device 7, the at least one control-target component extractor 12 is a plurality of control-target component extractors 12 each configured to extract a control-target component having a frequency from the sound source signal; and the at least one sound controller 14 is a plurality of sound controllers 14 provided respectively to the plurality of control-target component extractors 12. Each of the filters of each of the plurality of sound controllers 14 is an SAN filter set for the frequency of the control-target component extracted by the corresponding control-target component extractor 12. Each of the plurality of sound controllers 14 is further configured to, for each of the plurality of speakers 6 and for the frequency of the control-target component extracted by the corresponding control-target component extractor 12, adjust the amplitude and the phase of the control-target component using the corresponding SAN filter. Each of the plurality of sound combiners 15 is further configured to combine the control-target components whose amplitudes and phases have been adjusted for the respective speaker 6 and for each of the frequencies of the control-target components and the non-control-target component to generate the combined result.

With this configuration, the sound field control device 7 performs control using an SAN filter for each frequency band, which makes it possible to produce the listening area 2 and the quiet area 3 with a small amount of computation compared to a case in which an FIR filter is used and thus lower the cost and makes it possible to produce the listening area 2 and the quiet area 3 in a suitable manner.

Each of the at least one control-target component extractor 12 of the sound field control device 7 is configured to extract the control-target component using an SAN filter.

Therefore, the sound field control device 7 performs control (extraction) using the SAN filter in the at least one control-target component extractor 12, which makes it possible to produce the listening area 2 and the quiet area 3 with a small amount of computation compared to a case where an FIR filter is used and thus lower the cost.

Filter Determination System

Figure 6:
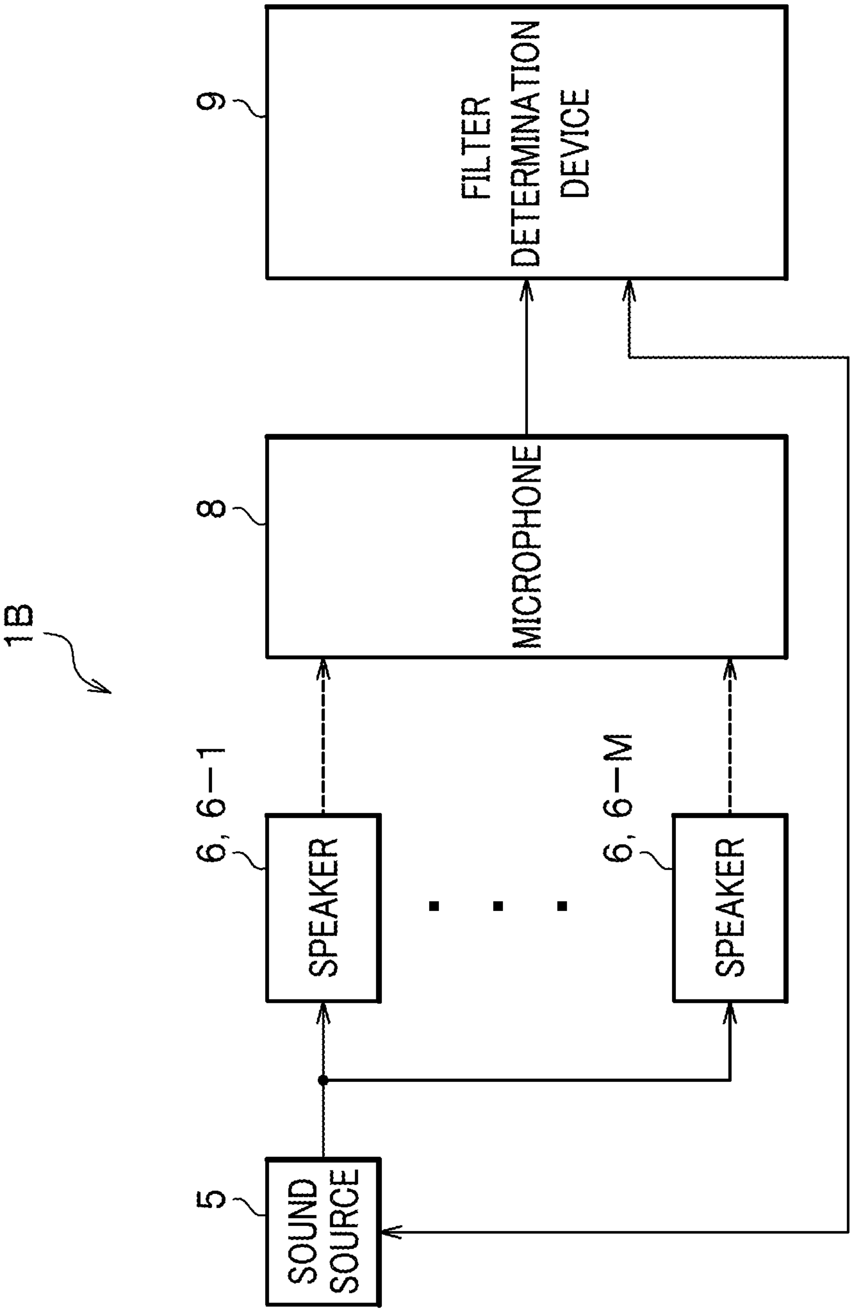
FIG. 6 is a schematic block diagram of the filter determination system according to the embodiment of the invention.

Subsequently, a description will be given of a system for determining the coefficients (Wrm, Wim) of the SAN filters for the sound controllers 14 of the sound field control device 7. As illustrated in FIG. 6, a filter determination system 1B according to an embodiment of the present invention includes: a sound source 5; a plurality of speakers 6 (6-1 to 6-M, where M=6 in the present embodiment); at least one microphone 8; and a filter determination device 9.

Sound Source, Speaker, and Microphone

In the present embodiment, the sound source 5 feeds a sound signal of the frequency band of each control-target component (control frequency) for which filter coefficients are to be determined to a corresponding one of the speakers 6. The speakers 6 each generate a sound based on the sound signal fed from the sound source 5. The at least one microphone 8 is used to pick up, at positions (grid points allocated in the form of a grid dividing the sound field) defined in the vehicle compartment (sound field) of the vehicle C, the sound of each control frequency generated by the speakers 6 and feeds the result of picking up the sound to the filter determination device 9.

The at least one microphone 8 may be configured such that at least one microphone is moved by an operator or a computer-controlled arm to each grid point to pick up the sound thereof. Alternatively, the at least one microphone 8 may be configured such that as many microphones as the number of the grid points are disposed at the grid points to pick up the sounds at the same time.

Filter Determination Device

The filter determination device 9 is constructed of a Central Processing Unit (CPU), a Read-Only Memory (ROM), a Random Access Memory (RAM), an input-output circuitry, and the like. The filter determination device 9 determines the coefficients Wr, Wi (Wrm, Wim) of the filters (SAN filters) used in the sound controllers 14 of the sound field control device 7, based on the result of picking up the sounds by the at least one microphone 8.

The filter determination device 9 controls the sound source 5 to cause each of the plurality of speakers to generate a sound for generating a sound field characteristic matrix G and, based on the result of picking up the sound by the microphone 8 arranged at each of the sound field grid points, generate the sound field characteristic matrix G, which contains sound field characteristics $G_{y,x}$ of all the sound field grid points (see Equation (4) below).

$$G = \begin{bmatrix} G_{1,1} & \cdots & G_{1,X} \\ \vdots & \ddots & \vdots \\ G_{Y,1} & \cdots & G_{Y,X} \end{bmatrix} \tag{4}$$

In Equation (4), Y corresponds to the number of the grid points and X corresponds to the number of the speakers 6 (X=M=6 in this embodiment).

The sound field characteristics $G_{y,x}$, which is the elements of the sound field characteristic matrix G, are each a transfer function of a sound generated by a speaker 6-*x* to a microphone 8 located at a grid point y in the sound field. The filter determination device 9 calculates sound field characteristics (transfer function including a gain and a phase) $G_{y,x}$ based on the sounds to be generated by the speakers 6 and the sounds picked up by the microphone 8.

The filter determination device 9 generates matrices $G_V$ and $G_Q$ for the listening area 2 and the quiet area 3 based on the sound field characteristic matrix G. The matrix $G_V$ relates to the sound field characteristic (transfer function) of one listening area 2. The matrix $G_V$ contains, of the elements of the sound field characteristic matrix G, the sound field characteristics (transfer functions) of the grid points corresponding to the listening area 2 (in other words, contains zeros as the sound field characteristics of the grid points corresponding to the quiet area 3). The matrix $G_Q$ relates to the sound field characteristic (transfer function) of a quiet area 3, which is the counterpart of the one listening area 2. The matrix $G_Q$ contains, of the elements of the sound field characteristic matrix G, the sound field characteristics (transfer functions) of the grid points corresponding to the quiet area 3 (in other words, contains zeros as the sound field characteristics of the grid points corresponding to the listening area 2).

The filter determination device 9 determines the coefficients Wr, Wi (Wrm, Wim) of the filters (SAN filters) used in the sound controllers 14 so as to maximize (sound energy in the listening area 2)/(sound energy in the quiet area 3). Here, the sound energy $E_V$ in the listening area 2 and the sound energy $E_Q$ in the quiet area 3 are respectively represented by Equations (5) and (6) below.

$$E_V \propto \sum_{u=1}^{YX} p_{Vu}^2 = W^H G_V^H G_V W \tag{5}$$

$$E_Q \propto \sum_{u=1}^{YX} p_{Qu}^2 = W^H G_Q^H G_Q W \tag{6}$$

Here, $p_{v,u}$ represents the sound pressure at a grid point position u in the listening area 2. $p_{v,u}$ represents the sound pressure at a grid point position u in the quiet area 3.

The filter determination device 9 calculates control characteristic W so as to maximize an evaluation function $J=E_V/E_Q$. The control characteristic W is an eigen vector corresponding to the maximum eigne values of the matrix $G^H{}_V G_V[G^H{}_Q G_Q]^{-1}$. The control characteristic W represent characteristics in the form of complex numbers and are given as Equation (7) below.

$$W = Wr + i \cdot Wi \tag{7}$$

Specifically, the real parts Wr (Wrm) of the control characteristic W are the coefficients to be applied to the cosine wave components of the control-target components extracted by the control-target component extractors 12; and the imaginary parts Wi (Wim) of the control characteristic W are the coefficients to be applied to the sine wave components of the control-target components extracted by the control-target component extractors 12. The filter determination device 9 calculates such control characteristic Wr, Wi (Wrm, Wim) for each of the speakers 6.

The filter determination device 9 determines, for a listening area 2 (and the quiet area 3 which is the counterpart of the listening area 2), the coefficients Wr, Wi (Wrm, Wim) for each frequency f (angular frequency ω). The filter determination device 9 determines such combination of the coefficients Wr, Wi (Wrm, Wim) for each listening area 2 (see FIG. 7). The filter determination device 9 generates, for each listening area 2, a table that associates the frequencies f and the coefficients Wr, Wi (Wrm, Wim), and store the table in a memory. Note that the values of the coefficients Wr, Wi (Wrm, Wim) are not limited to those specified in the table illustrated in FIG. 7.

Each of the sound controllers 14 of the sound field control device 7 adjusts the control-target component using the coefficients Wr, Wi (Wrm, Wim) for the corresponding listening area 2 and the corresponding frequency f (angular frequency ω). Note that the sound controllers 14 may be configured to use the table generated by the filter determination device 9 in such a way as to store the coefficients Wr, Wi (Wrm, Wim) for each frequency f (angular frequency ω) for each listening area 2 per the listening area 2 in the form of a table and retrieve and use the coefficients Wr, Wi (Wrm, Wim) for a listening area 2. In this case, it is possible for one combination of a control-target component extractor 12 and a sound controller 14 to process a plurality of listening areas 2.

A filter determination system 1B according to an embodiment of the present invention is a system for setting the coefficients of the filters of the sound field control device 7. The filter determination system 1B includes: at least one microphone 8 used to pick up sounds generated by the plurality of speakers 6, at a plurality of positions in the sound field; and a filter determination device 9 configured to determine the coefficients of the filters based on the result of picking up the sounds by the at least one microphone 8 so as to, regarding the listening area 2 set in the sound field and the quiet area 3 set in the sound field, maximize a value obtained by dividing a value of sound energy in the listening area 2 by a value of sound energy in the quiet area 3.

With this configuration, the filter determination system 1B determines suitable filter coefficients for generating the listening area 2 and the quiet area 3 in the sound field.

The filter determination device 9 of the filter determination system 1B determines, for each of the frequencies of the control-target components, the coefficients of the filters each functioning as an SAN filter so as to maximize a value obtained by dividing a value of sound energy in the listening area 2 by a value of sound energy in the quiet area 3.

With this configuration, the filter determination system 1B determines suitable coefficients for the filter for producing the listening area 2 and the quiet area 3 in the sound field for each frequency band.

The filter determination device 9 of the filter determination system 1B generates a table in which the frequencies of the control-target components are associated with the coefficients.

The filter determination system 1B provides filter coefficients in a form suitable to the sound field control device 7.

Although an embodiment of the present invention has been described above, it is to be understood that the present invention is not limited only to the above-described embodiment and the embodiment can be modified as appropriate within the range not departing from the gist of the invention.

What is claimed is:

1. A sound field control device for producing a listening area and a quiet area in a sound field using a plurality of speakers, the sound field control device configured with a processor configured to function as:

a non-control-target component extractor configured to extract a non-control-target component from a sound source signal;

a speaker selector configured to select at least one of the plurality of speakers as a speaker to output the non-control-target component, based on a location of the listening area;

at least one control-target component extractor each configured to extract a control-target component from the sound source signal;

at least one sound controller provided respectively to the at least one control-target component extractor and configured to, for each of the plurality of speakers, adjust an amplitude and a phase of the control-target component extracted by the corresponding control-target component extractor, based on locations of the listening area and the quiet area using a filter having coefficients set for the speaker; and a plurality of sound combiners provided respectively for the plurality of speakers, the sound combiners each configured to combine the control-target component which has been extracted by the at least one control-target component extractor and whose amplitude and phase have been adjusted and the non-control-target component to generate a combined result and to output the combined result to the corresponding speaker, wherein the at least one control-target component extractor is a plurality of control-target component extractors each configured to extract a control-target component having a frequency from the sound source signal, wherein the at least one sound controller is a plurality of sound controllers provided respectively to the plurality of control-target component extractors, wherein each of the filters of each of the plurality of sound controllers is a single-frequency adaptive notch (SAN) filter set for the frequency of the control-target component extracted by the corresponding control-target component extractor, wherein each of the plurality of sound controllers is further configured to, for each of the plurality of speakers and for the frequency of the control-target component extracted by the corresponding control-target component extractor, adjust the amplitude and the phase of the control-target component using the corresponding SAN filter, and wherein each of the plurality of sound combiners is further configured to combine the control-target components whose amplitudes and phases have been adjusted for the respective speaker and for each of the frequencies of the control-target components and the non-control-target component to generate the combined result.

2. The sound field control device according to claim 1, wherein each of the plurality of control-target component extractors is configured to extract the corresponding control-target component using a control-target component extractor single-frequency adaptive notch (SAN) filter.

3. A filter determination system for setting the coefficients of the SAN filters of each of the plurality of sound controllers of the sound field control device according to claim 1, the filter determination system comprising:

at least one microphone used to pick up sounds generated by the plurality of speakers, at a plurality of positions in the sound field; and a filter determination device comprising a processor configured to determine, for each of the frequencies of the control-target components, the coefficients of each of the SAN filters of the sound controller corresponding to the frequency based on a result of picking up the sounds by the at least one microphone so as to maximize a value obtained by dividing a value of sound energy in the listening area by a value of sound energy in the quiet area.

4. The filter determination system according to claim 3, wherein the filter determination device is further configured to generate a table that associates the frequencies of the control-target components with the coefficients of the SAN filters.

5. A sound field control device for producing a listening area and a quiet area in a sound field using a plurality of speakers, the sound field control device configured with a processor configured to function as:

a non-control-target component extractor configured to extract a non-control-target component from a sound source signal;

a speaker selector configured to select at least one of the plurality of speakers as a speaker to output the non-control-target component, based on a location of the listening area;

at least one control-target component extractor each configured to extract a control-target component from the sound source signal;

at least one sound controller provided respectively to the at least one control-target component extractor and configured to, for each of the plurality of speakers, adjust an amplitude and a phase of the control-target component extracted by the corresponding control-target component extractor, based on locations of the listening area and the quiet area using a filter having coefficients set for the speaker; and a plurality of sound combiners provided respectively for the plurality of speakers, the sound combiners each configured to combine the control-target component which has been extracted by the at least one control-target component extractor and whose amplitude and phase have been adjusted and the non-control-target component to generate a combined result and to output the combined result to the corresponding speaker, wherein each of the at least one control-target component extractor is configured to extract the control-target component using a single-frequency adaptive notch (SAN) filter.

* * * * *